(12) United States Patent
Blakeslee

(10) Patent No.: US 10,206,526 B1
(45) Date of Patent: Feb. 19, 2019

(54) WALL HANGING ARMATURE

(71) Applicant: A Curious Soup, LLC, Greenville, NC (US)

(72) Inventor: Stanton Edward Blakeslee, Winterville, NC (US)

(73) Assignee: A Curious Soup, LLC, Greenville, NC (US)

( * ) Notice: Subject to any disclaimer, the term of this patent is extended or adjusted under 35 U.S.C. 154(b) by 0 days.

(21) Appl. No.: 15/681,680

(22) Filed: Aug. 21, 2017

(51) Int. Cl.
| | |
|---|---|
| A47F 7/14 | (2006.01) |
| A47G 1/16 | (2006.01) |
| A47G 1/17 | (2006.01) |
| A47G 1/22 | (2006.01) |
| F16B 13/00 | (2006.01) |

(52) U.S. Cl.
CPC .................. *A47G 1/16* (2013.01); *A47G 1/17* (2013.01); *A47G 1/22* (2013.01); *F16B 13/002* (2013.01)

(58) Field of Classification Search
CPC ........... A47B 96/06; A47F 7/14; F16M 13/02; A47G 1/20
See application file for complete search history.

(56) References Cited

U.S. PATENT DOCUMENTS

| | | | | |
|---|---|---|---|---|
| 1,616,957 A | * | 2/1927 | Honigbaum | A47G 1/22 211/87.01 |
| 3,966,157 A | * | 6/1976 | Corral | A47G 1/20 248/217.3 |
| 4,458,387 A | * | 7/1984 | Pearson | A47C 31/02 24/101 B |
| 5,236,168 A | * | 8/1993 | Roy | A47G 1/162 248/498 |
| 6,196,506 B1 | * | 3/2001 | Wakai | F16B 37/02 248/216.1 |
| 6,641,107 B1 | * | 11/2003 | Janssen | A47G 1/20 248/339 |
| 7,431,258 B2 | * | 10/2008 | Lamotta | A47G 1/20 248/217.3 |
| 8,434,730 B2 | * | 5/2013 | Ahlstrom | A47G 1/168 248/206.5 |
| 9,261,229 B2 | * | 2/2016 | Callif | A47G 1/20 |

FOREIGN PATENT DOCUMENTS

| | | |
|---|---|---|
| CN | 204403111 U | 6/2015 |
| DE | 10 2005 043 825 A1 | 4/2007 |
| FR | 2741403 | 5/1997 |
| FR | 2984977 | 6/2013 |

* cited by examiner

*Primary Examiner* — Amy J. Sterling
(74) *Attorney, Agent, or Firm* — James G. Passé; Passé Intellectual Property, LLC

(57) ABSTRACT

The present invention is a one-piece mounting device for hanging items on a wall. The plate has a puncture device which pierces the wallboard and holds the device on the wall.

11 Claims, 10 Drawing Sheets

WALL HANGING ARMATURE

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a wall hanging armature. In particular, it relates to a device to attach to wallboard to enable the hanging of objects therefrom.

Description of Related Art

The hanging of pictures and other objects on a wallboard is well known. Some sort of anchor, nail, or the like is either attached to the face of the wall or something is driven in through the wallboard in order to place a hanger device to hang the picture or other object on the wall. These devices usually work with some sort of nail that is angled into the wall or with a long stiff wire placed through a hole creating fix points between the upper back of the wall above the hole and the lower front of the wall below the hole.

Unfortunately, the reason for the wide variety of devices is the difficulty in using some, the cost, and the poor ability to hold something in place. In addition, there is usually a hammer, drill or other tool necessary to install the device to further add to the difficulties. Even further, most of the products involve multiple pieces, making it easy to lose a critical piece. There is still, therefore, a need for a device that attaches without tools and that is not separate pieces that must be assembled.

BRIEF SUMMARY OF THE INVENTION

The present invention is a device that overcomes the above problems and provides utility as can be seen from the descriptions herein. The present invention is a plate which has an armature cut or molded into the plate and bent out or positioned to about 90 degrees and also has a short pointed arrowhead tip for piercing the wallboard and attaching the plate between the inner and outer surface of the wallboard.

Accordingly, in one embodiment, there is a one-piece device for attaching to wallboard and hanging an object therefrom comprising:
 a) a flat plate having a front side and a wall side;
 b) an armature positioned at about 90 degree angle relative to the wall side of the plate wherein the armature has a longitudinal V-shape and has a distal end comprising a pointed arrowhead having a pair of ears; and
 c) wherein the device attaches to wallboard by insertion of the armature through the wallboard creating attachment of the ears to an inside surface of the wallboard and the wall side of the front plate to an outer surface of the wallboard.

DETAILED DESCRIPTION OF THE INVENTION

Figure 1:
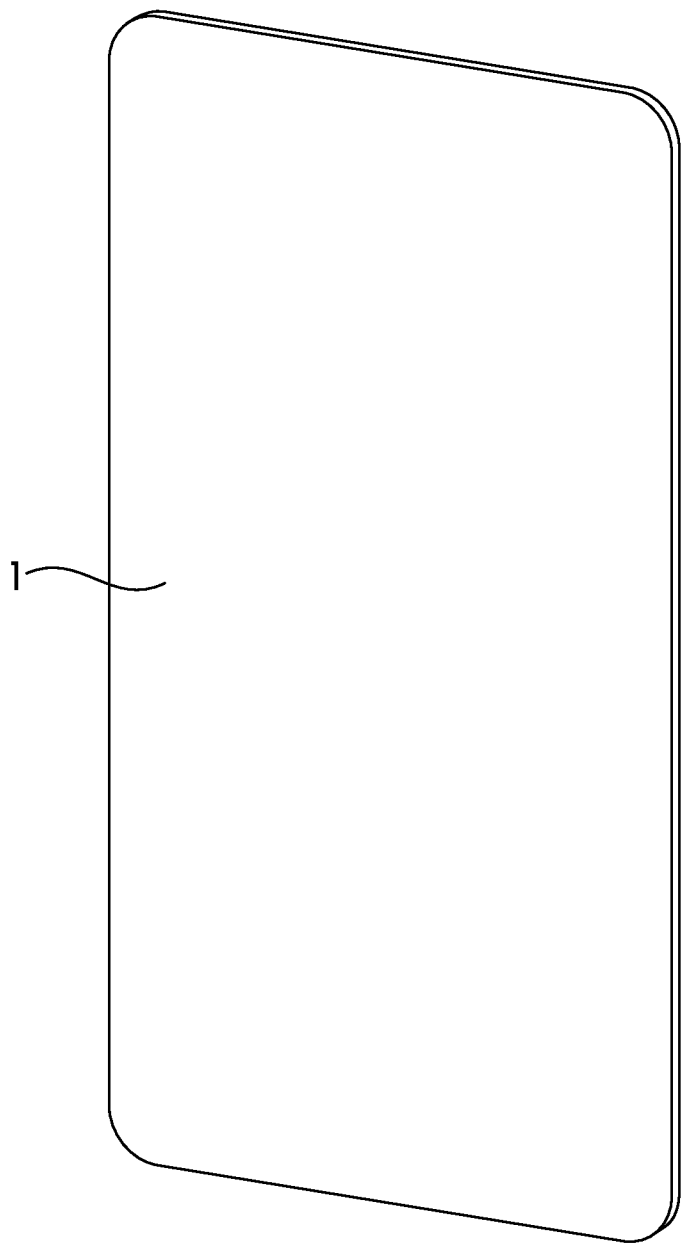
FIG. 1 is a front view of a plate before adaptation.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

Definitions

The terms "about" and "essentially" mean±10 percent.
The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "flat plate" refers to a stiff piece of metal (such as stainless steel), plastic, or the like. While the shape is immaterial, in one embodiment, it is rectangular, as shown in the drawings. While it could be any thickness in general, in one embodiment, it is from about a quarter inch to about ⅜ inch thick. The dimensions, in one embodiment, are from about 1½ inches to about 2 inches tall and from about half an inch to about an inch wide. In one embodiment, it is 1¾ inch tall and ¾ inch wide. The plate has an inner wall side which is placed against the wall and an opposing front side of the plate. In one embodiment, the thickness of the plate is about 0.5 mm. The plate can be metal and an armature cut into the plate or can be plastic and molded, e.g. by injection molding.

As used herein the term "wallboard" refers to a panel made of calcium sulfate dihydrate (gypsum) or the like with or without additives and normally pressed between a facer and a backer (typically thick sheets of paper). It is used to make vertical interior walls and ceilings. The plaster is mixed with fiber (typically paper and/or fiberglass), plasticizer, foaming agent, and various additives that can decrease mildew, increase fire resistance, and lower water absorption. While any thickness generally used is contemplated, in one embodiment, it is about ⅝ in thick.

As used herein the term "object" refers to any object which is normally hung from an interior wall made of wallboard. It can be framed pieces such as photographs and art but can also be any other type of device of a size and weight hung on walls. In some cases, multiple devices of the invention are used to support heavier object mounted on the wall.

As used herein the term "armature or arm" refers to a slender part of the device projecting from the main part (plate). The armature is cut or molded into the plate and folded out or positioned from the plate wherein the armature can be bent away from the plate to about a 90 degree angle and a V-shaped bend or angle placed in the armature longitudinally, as shown in the Figures. The armature has an arrowhead cut into the distal end of the armature along with ears to grab the inside of the wallboard.

As used herein the term "cut" refers to cutting through the plate with appropriate tools leaving one edge attached to be able to bend the arm or hook or other feature away from the plate, as seen in the Figures. Molding refers to manufacture by standard molding techniques, such as injection molding for plastic version.

As used herein the term "V-shape" refers to a V-shaped bend or angle of about 45-120 degrees which is placed or molded longitudinally in the armature. In one embodiment, the bend is formed at an angle of exactly 90 degrees. It extends from the proximal end of the armature next to the plate all the way out to the distal end of the armature at the point of the arrowhead.

As used herein the term "arrowhead" refers to the distal end of the armature cut or molded with a sharp pointed end and a pair of pointed ears forming an arrowhead shape with the V-shape running down the middle of the arrowhead as well as the rest of the armature, as shown in the Figures. The pointed ears are designed to grab the inside surface of the wallboard and the distance between the armature proximal end and the ears is about the same as the thickness of the wallboard the device is to be utilized on. The device then can be shoved into the wallboard and held in place by pressure of the weight of an object on the front side of the plate and sticking of the ears between the inside of the wallboard and the offside of the wallboard, as shown in the Figures. When an object is placed on the plate, it creates a slight angle against the inside of the wallboard. Removal is done by pulling straight out of the wall (no angle).

As used herein the term "sticky surface" refers to the addition of something sticky like double sided tape or pad or addition of glue to the front face such that one can stick anything to the sticky material for mounting on the wall.

Figure 5:
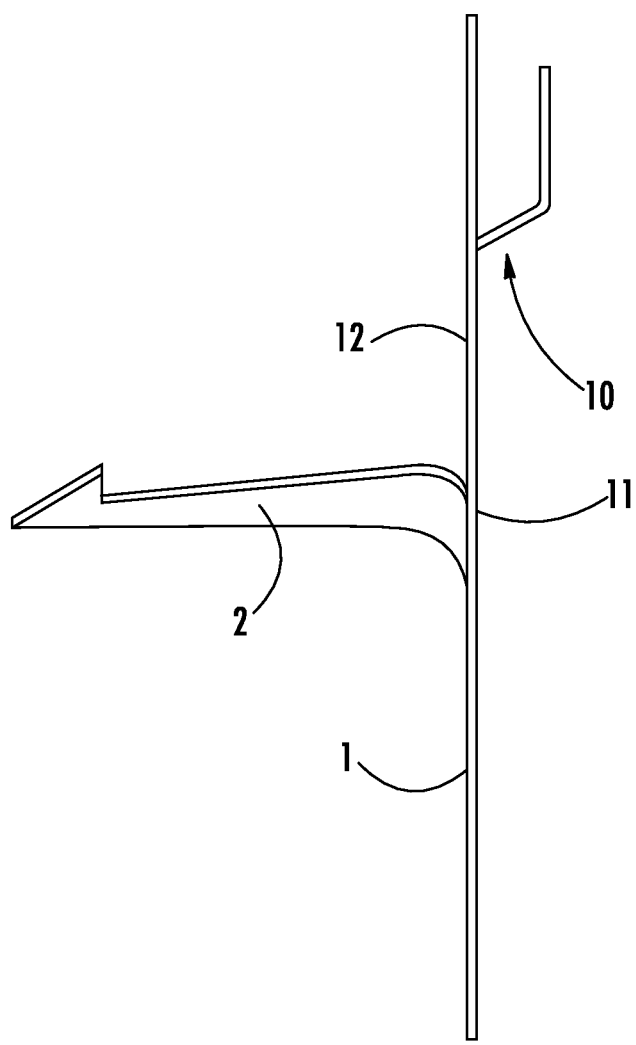
FIG. 5 is a side view showing an optional hook bent or molded into the device.
Figure 9:
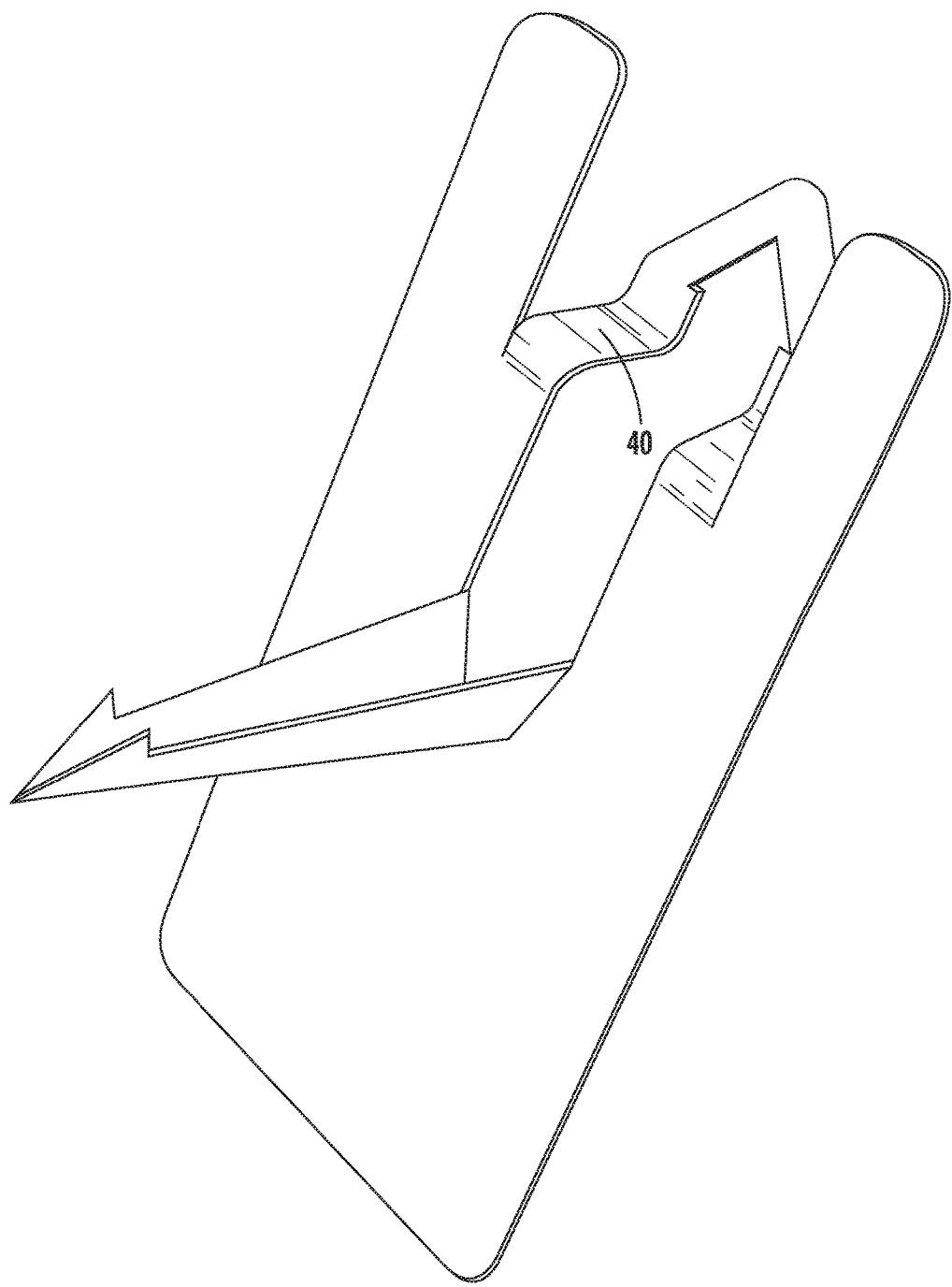
FIG. 9 is a perspective view of the device with a shelf that is bent or molded into the device, which provides a hook function built into the device itself (see FIG. 3).

As used herein the term "hook" or "bend" refers to an angle bend that is cut and bent or molded into the plate such that objects can be hung from it such as artwork, clothes, pictures, and the like, as shown in, for example, FIGS. 5 and 9.

DRAWINGS

Now referring to the drawings, FIG. 1 is a frontal view of plate 1 before the armature has been placed into it.

Figure 2:
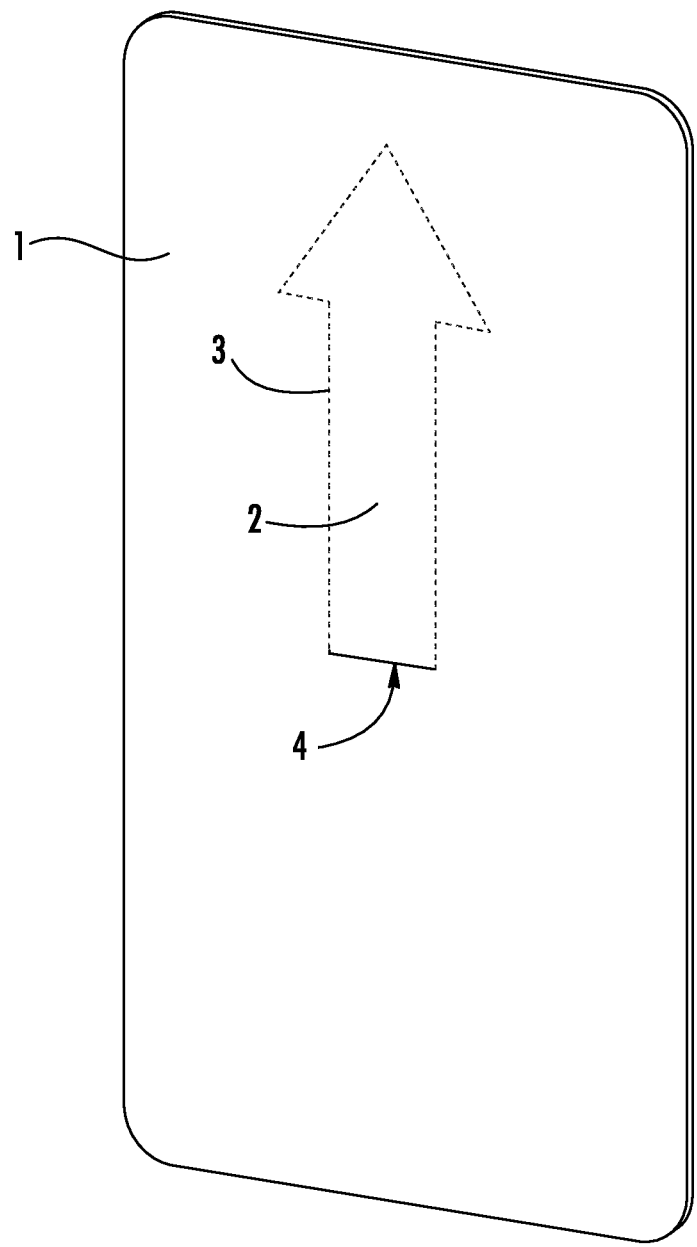
FIG. 2 is the plate with the armature cut into it before bending.

FIG. 2 shows the armature 2 which has not yet been bent to 90 degree angle on a metal plate. Dashed cut line 3 is shown and uncut area 4 that becomes the hinge to bend from.

Figure 3:
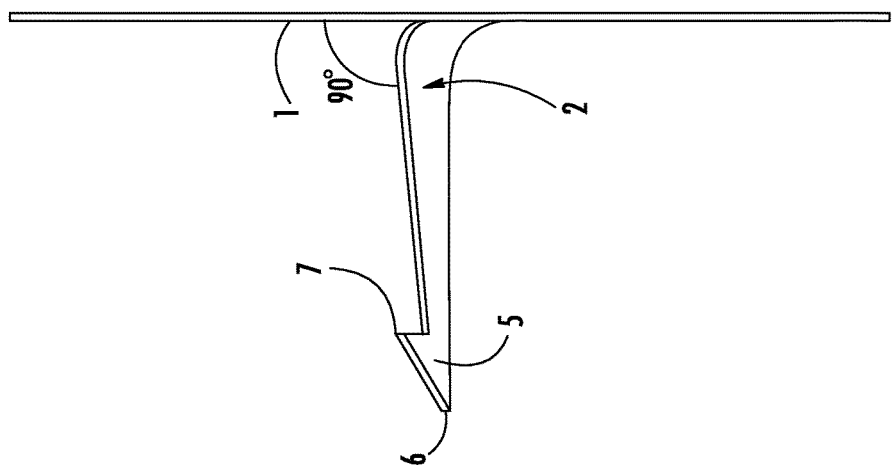
FIG. 3 is a side view of the armature that is bent or molded into place.

FIG. 3 is the same device as shown in FIG. 9 which shows the armature 2 bent or molded to about 90 degrees having arrowhead 5 with point 6 and ear 7.

Figure 4:
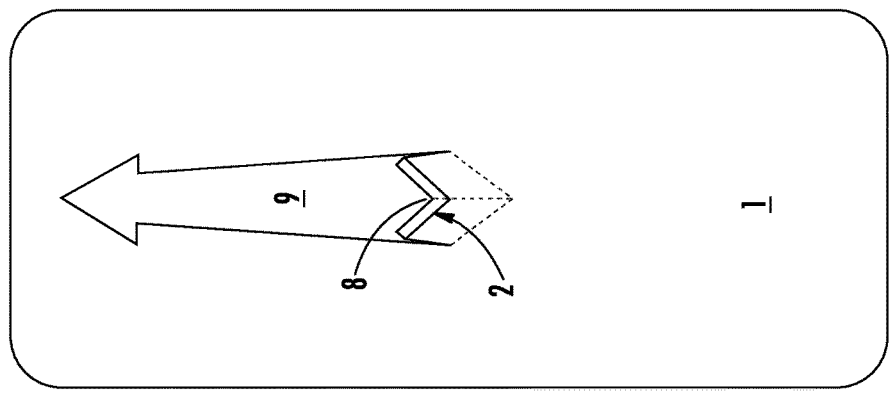
FIG. 4 is a front view of the device showing the V-shape in the armature.

FIG. 4 shows an embodiment of the device as in FIG. 3 from a frontal position. In this view, the V-shape 8 can be seen running up the middle of armature 2. Area 9 is the area the armature was cut from in plate 1.

FIG. 5 shows the device of the previous figure with an additional hook 10 molded or cut and bent from the plate in the same manner as the armature 2. The hook is on the front side 11 and the armature 2 on the wall side 12.

Figure 6:
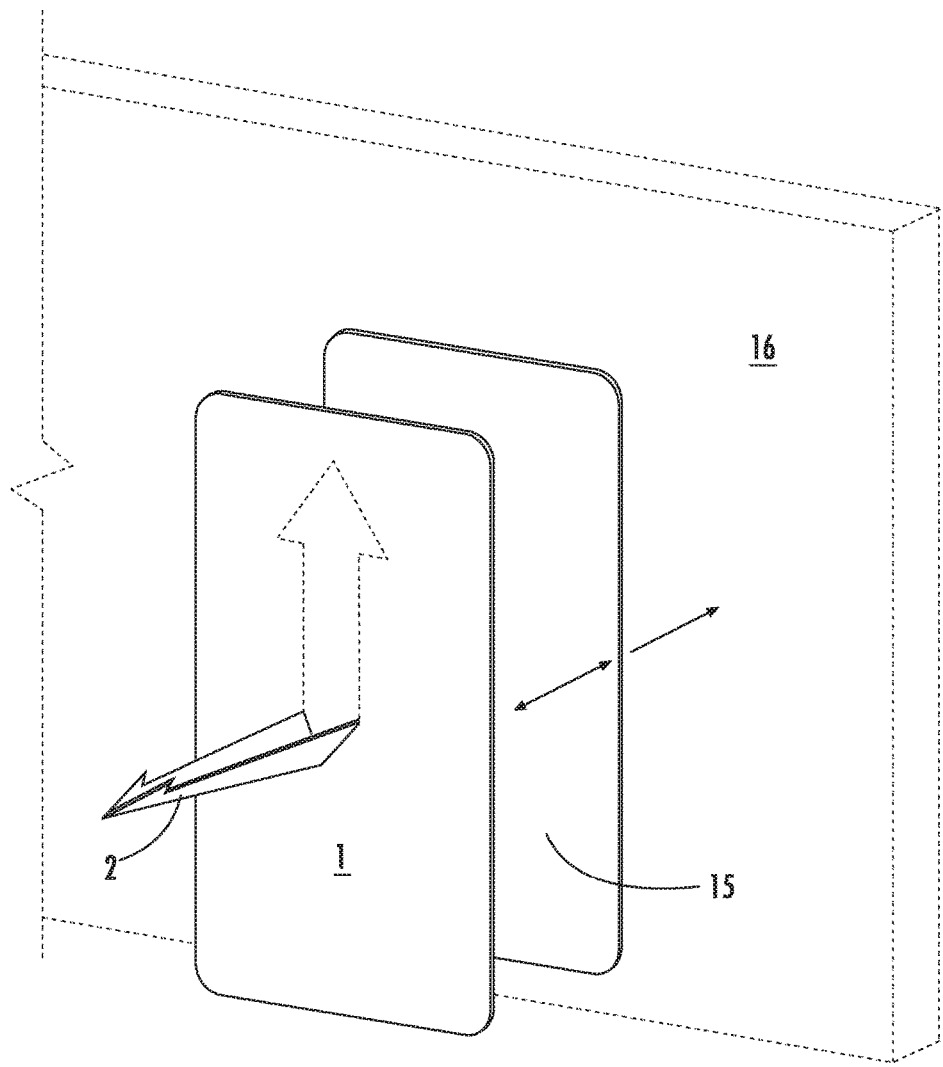
FIG. 6 is a front view showing a sticky pad attached to the front of the plate for attaching objects.

FIG. 6 shows the addition of a double sided sticky tape foam type material 15 with an object 16 being applied to the sticky portion.

Figure 7A:
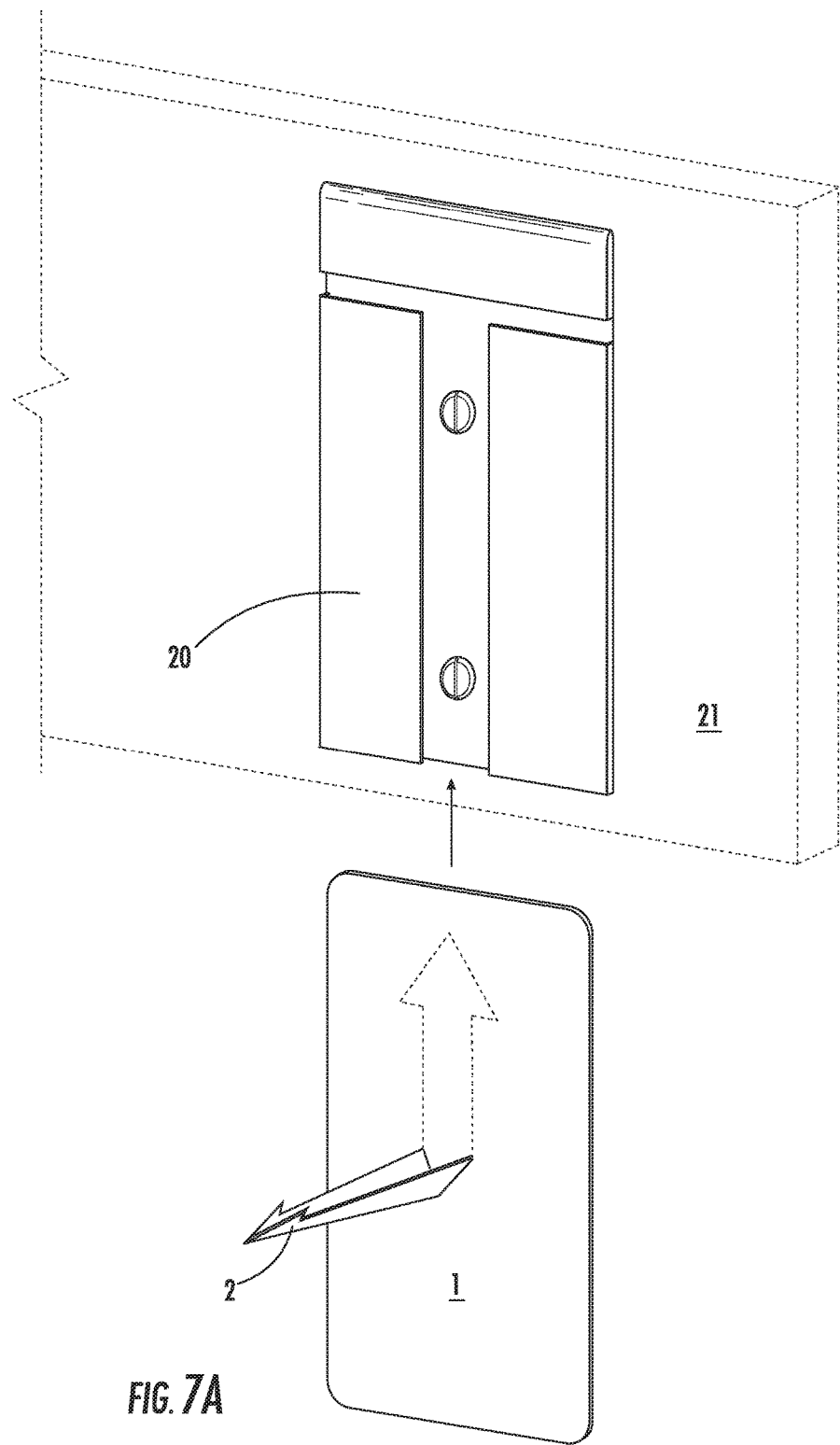
FIG. 7a is a perspective view of a sleeve used with the mounting device.

FIG. 7a shows an embodiment where a sleeve 20 is attached to an object 21 and then the sleeve 20 slides onto the plate to mount object 21 to the wall.

Figure 7B:
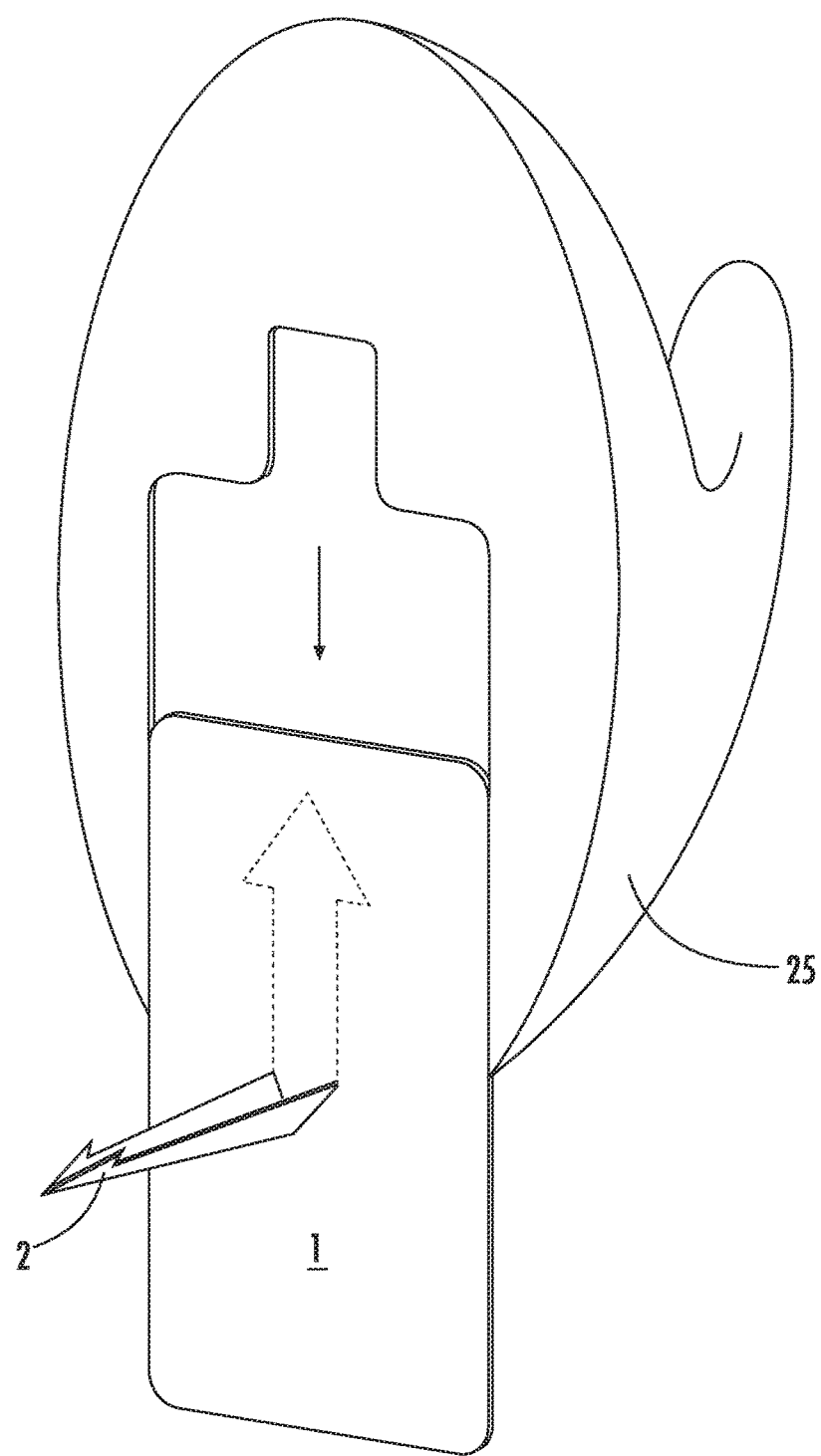
FIG. 7b shows a sleeve hook utilized with the present invention.

FIG. 7b shows another sleeve type attachment to plate 1 which is a decorative hook 25.

Figure 7C:
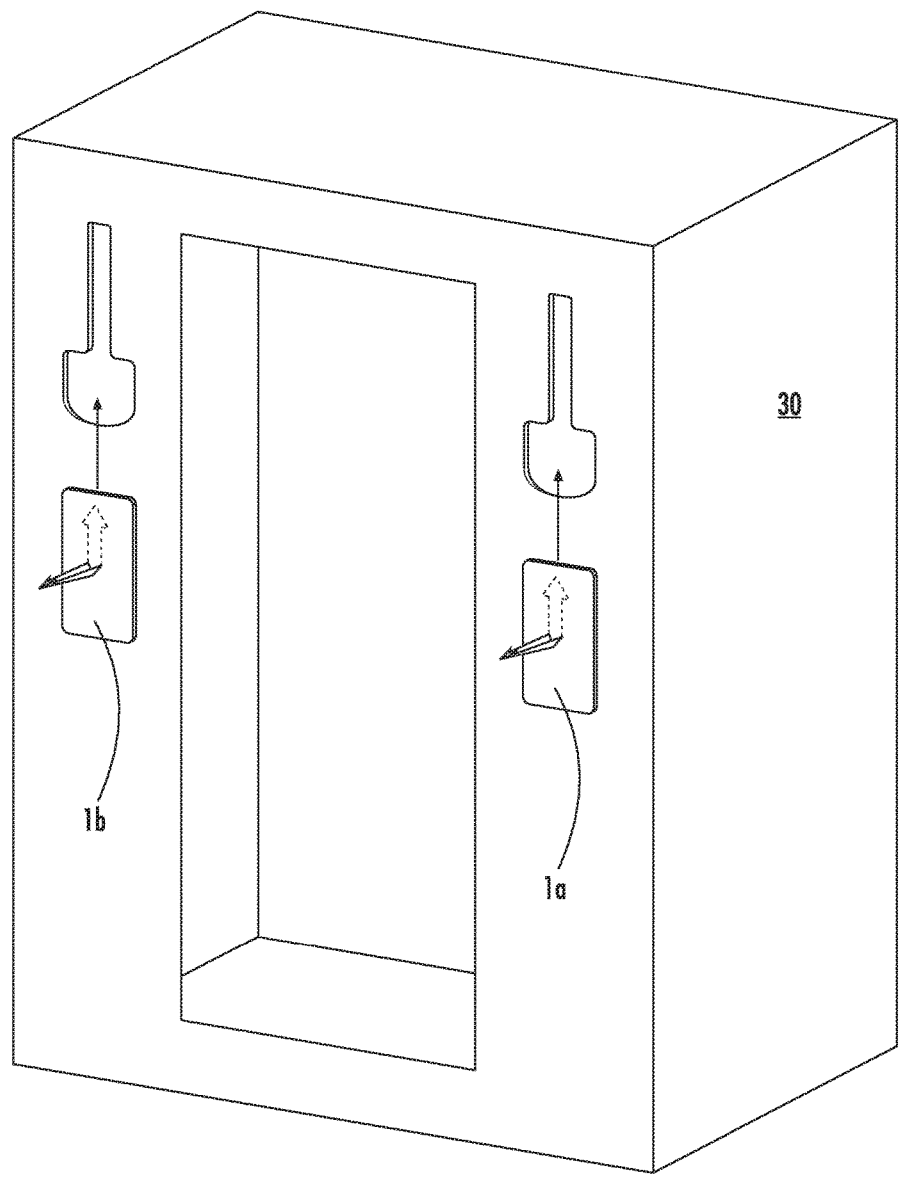
FIG. 7c shows use of multiple devices to hang a single object.

FIG. 7c shows an embodiment where devices 1a and 1b are attached to a box 30 for mounting a single object with a plurality of devices.

Figure 8:
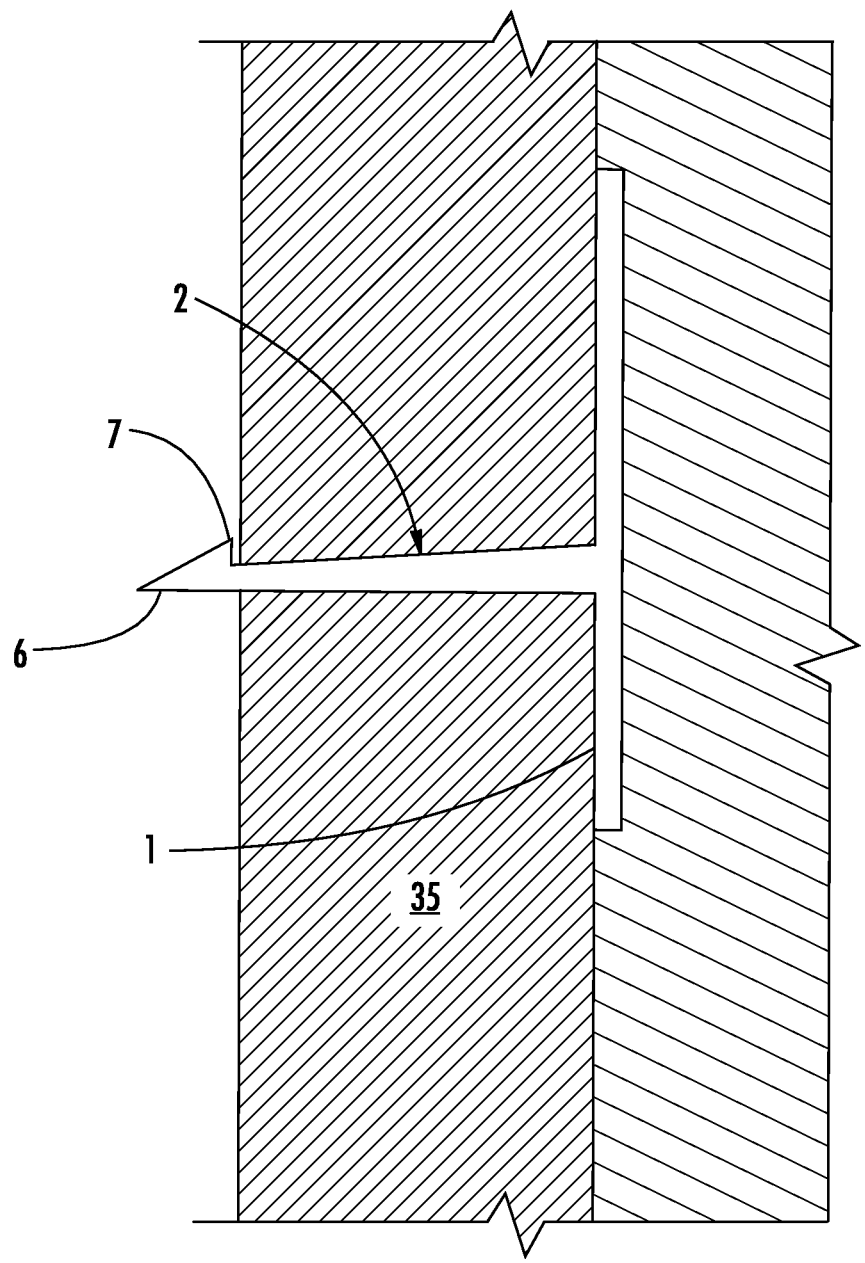
FIG. 8 is a side view of the device installed on a piece of sheetrock.

FIG. 8 is a side view of the device mounted through a vertical piece of sheet rock 35.

FIG. 9 is a perspective view of a bend that creates a shelf for hanging a wire frame picture, or the like, on shelf 40.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A one-piece device for attaching to wallboard and hanging an object therefrom comprising:
    a) a flat plate having a front side and a wall side;
    b) an armature positioned at about a 90 degree angle relative to the wall side of the plate cut out of or molded into the flat plate wherein the armature has been bent or molded into a longitudinal V-shape the entire length of the armature and has a distal end consisting of an arrowhead having a pointed tip and a single pair of ears with the V-shape running down the middle of the arrowhead; and
    c) wherein the device attaches to wallboard by insertion of the arrowhead pointed tip of the armature through the wallboard which is of a length that it creates attachment of the ears to an inside surface of the wallboard and holds the wall side of the front plate to an outer surface of the wallboard.

2. The device according to claim 1 wherein there is a sticky surface on the front side of the flat plate for attaching objects.

3. The device according to claim 1 wherein a hook is positioned on the plate at a desired angle relative to the front side of the plate in a manner to hang objects therefrom.

4. The device according to claim 1 wherein the device is mounted on sheetrock.

5. The device according to claim 4 wherein the device was mounted by manually pushing the armature through the sheetrock such that the device is held in place by single pair of ears by attachment to the inside of the sheetrock.

6. The device according to claim 1 wherein there is an object attached to the device.

7. The device according to claim 6 wherein there are a plurality of devices attached to the object.

8. The device according to claim 1 wherein there is a sleeve used to attach the object to the device.

9. The device according to claim 1 wherein the device is metal.

10. The device according to claim 1 wherein the device is molded plastic.

11. The device according to claim 1 wherein the V-shape has a bend of between 40 and 120 degrees.

* * * * *